(12) United States Patent
Grandjean et al.

(10) Patent No.: US 6,236,509 B1
(45) Date of Patent: May 22, 2001

(54) DIFFRACTIVE OPTICAL SYSTEM WITH SYNTHETIC OPENING AND LASER CUTTING DEVICE INCORPORATING THIS SYSTEM

(75) Inventors: Jean-Paul Grandjean, Sabran; Patrick Meyrueis, Strasbourg; Bernard Kress, Neubourg; Patrice Twardowski, Strasbourg, all of (FR)

(73) Assignee: Commissariat a l'Energie Atomique, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/147,261
(22) PCT Filed: May 13, 1997
(86) PCT No.: PCT/FR97/00843
§ 371 Date: Nov. 13, 1998
§ 102(e) Date: Nov. 13, 1998
(87) PCT Pub. No.: WO97/43682
PCT Pub. Date: Nov. 20, 1997

(30) Foreign Application Priority Data
May 15, 1996 (FR) .................................................. 9606088

(51) Int. Cl.[7] ........................... G02B 27/44; G02B 27/46; G02B 5/18; G02B 3/08
(52) U.S. Cl. ......................... 359/566; 359/565; 359/569; 359/559; 359/16; 359/742
(58) Field of Search .................................. 359/9, 16, 559, 359/563, 565, 566, 571, 569

(56) References Cited

U.S. PATENT DOCUMENTS

| | | |
|---|---|---|
| 4,192,578 | 3/1980 | Suzuki et al. . |
| 4,826,269 | 5/1989 | Streifer et al. ........................ 359/742 |
| 4,832,464 | * 5/1989 | Kato et al. ............................ 359/565 |
| 5,566,024 | * 10/1996 | Rauch ................................... 359/566 |
| 5,774,239 | * 6/1998 | Feldman et al. ........................ 359/16 |

FOREIGN PATENT DOCUMENTS

WO 96/00912   1/1996   (WO) .

OTHER PUBLICATIONS

R. W. Gerchberg and W. O. Saxton, "A Practical Algorithm for the Determination of Phase from Image and Diffraction Plane Pictures", OPTIK, vol. 35, No. 2, pp. 237–246, (1972).

* cited by examiner

Primary Examiner—Audrey Chang
(74) Attorney, Agent, or Firm—Oblon, Spivak, McClelland, Maier & Neustadt, P.C.

(57) ABSTRACT

An optical device for focusing a light beam. The device includes a Fourier diffractive element that can separate an incident beam into n beams along n directions which are symmetric about an optical axis. The device also includes a diffractive element including n Fresnel lenses capable of refocusing the n beams onto the optical axis. The device may be used with lasers and laser cutting devices.

25 Claims, 8 Drawing Sheets

DIFFRACTIVE OPTICAL SYSTEM WITH SYNTHETIC OPENING AND LASER CUTTING DEVICE INCORPORATING THIS SYSTEM

BACKGROUND OF THE INVENTION

1. Field of the Invention

The invention relates to the domain of laser cutting, particularly in view of dismantling and/or disassembly operations.

2. Discussion of the Background

The advantage of using laser techniques for carrying out dismantling operations is that it provides some process flexibility (possibility of remote cutting and variation of the cutting distance), and large potential benefits in terms of secondary cutting waste (less aerosols, less swarf, smaller cutting widths).

However, very few of these systems have been used, for three main reasons:

the most powerful laser sources, particularly $CO_2$ sources, require beam transport by mirrors since the wave length of $CO_2$ sources is incompatible with materials used for power optic fibers. These mirrors enable the necessary movements for cutting. The resulting mechanism is very complicated, particularly when it is necessary to cross confinements and biological shielding in nuclear installations.

the power of sources producing a beam that can be transported by optical fibers (for example Nd:YAG) did not exceed one kW until the last few years. Furthermore, the use of the optical fiber transmission technique causes problems which will be described below, traditional laser cutting processes require the use of assistance gases to make cutting feasible (flushing of molten material, protection of optics), which consequently requires that the part to be cut should be followed very closely (at about 1 to 2 mm).

These constraints have made it very difficult to use lasers in cutting for dismantling for which confinement is compulsory, it is often necessary to pass through biological shielding, and proximity following is practically impossible since the geometry of objects to be cut is complex, not well known (since it is often difficult to measure, particularly in a nuclear environment) and very variable.

The use of optical fibers has also created a number of problems.

The emerging beam is disturbed due to its path, particularly at the exit from the fiber; for example, a beam with a Gaussian distribution about its center line has an annular shape at the exit from a conventional step-index fiber. Consequently, the maximum energy distribution is eccentric, and cutting performances are reduced.

For focal length of the order of one meter, beam disturbances can be corrected using conventional glass lenses, for example type BK7. These lenses are transparent to infrared (wave length 1.06 $\mu$m) emitted by an Nd:YAG laser. But the weight of a device based on this technology and for this focal length is around 15 to 20 kg. Furthermore, this type of assembly is as delicate as a telescope with the same aperture (20 cm) and, for example, must be protected from shocks that would modify the settings and affect operational safety.

Consequently, remote servocontrol of the focal length (zoom) necessary for cutting parts with complex geometry is practically impossible using conventional glass mirrors or lenses with reasonable size, fragility and weight parameters. Therefore, it is not really feasible to achieve focal lengths exceeding a meter, for laser cutting for dismantling using conventional optical systems that are more suitable for use in the laboratory and/or for short focal lengths (less than one meter) than for cutting on nuclear sites at long distances.

The use of mirrors to manufacture focusing lenses would further increase the size for an equivalent weight and fragility, taking account particularly of stiffening devices and mirror mountings.

SUMMARY OF THE INVENTION

The first objective of the invention is an optical focusing device with limited size and weight, which is fairly robust and is compatible with the use of a power laser, particularly for use in a laser cutting device. The optical focusing device must enable correction of defects caused by an optical laser beam transmission fiber.

The term "Fourier diffractive element" used below refers to a diffractive element that diffracts and divides an incident planewave into n planewaves. As is well known in the art, the mathematical relation between the complex amplitude transmission of a far field diffractive element and its diffraction pattern results from a Fourier transformation. Furthermore and as discussed below, the design algorithms for the diffractive element includes an iterative Fourier transformation. Consequently, persons of ordinary skill in the art often refer to such diffractive elements as "Fourier diffractive elements."

More precisely, the first purpose of the invention is an optical laser beam focusing device, comprising:

a Fourier diffractive element that is capable of separating an incident beam into n beams along n directions symmetric about an optical axis of the device, a diffractive element comprising n Fresnel lenses, capable of refocusing the n beams on the optical axis.

The advantages related to this device include the following.

The diffractive optical system corrects beam aberrations resulting from the fact that the beam was transported by an optic fiber. This correction may be made using a Fourier lens or Fresnel lenses, or partially corrected using both types of lenses.

This device is capable of synthesizing a large aperture using small components. It is a Fourier-Fresnel type assembly with a synthetic aperture, which separates the incident beam into n identical beams (using a Fourier diffractive element) and focuses these n beam portions (using n Fresnel lenses) and consequently replaces a lens with a large aperture, and therefore a large size in general, by a smaller assembly.

From the manufacturing point of view, the problem of manufacturing a large Fresnel diffractive component (100 mm minimal diameter) is reduced to the problem of machining n smaller components.

Furthermore, it is easy to use this type of device. The focal length is varied simply by moving one of the components parallel to the other. Since the chosen Fresnel-Fourier formula is not critical, their respective positions may be controlled with mechanically simple means.

This type of device is adapted to use with a power laser. Furthermore, it forms an optical component which is not very sensitive to environmental disturbances (vibrations, shocks, dust, etc.) and is therefore suitable for use on site, for example for a laser dismantling installation. Finally, this device may easily be replaced, for example in the form of modules; no critical optical positioning or realignment is necessary during the replacement.

The two elements (Fourier diffractive element and all Fresnel elements) may be laid out such that the device operates in transmission or in reflection. In the latter case, the two elements are laid out such that an incident beam is reflected by the Fourier diffractive element and broken down into n beams, each of these beams then being reflected by one of the Fresnel lenses towards the focus point.

Means, for example such as refractive elements, may also be provided for collimating the incident beam.

Another purpose of the invention is a device for creating focused laser radiation, comprising means of generating a laser beam and a focusing device like that described above.

The result is an assembly that operates in a fairly simple manner, with all the advantages described above in relation to the focusing device.

In particular, if the beam is transmitted by optical fiber at the exit from the laser, the focusing device can correct aberrations related to transport by optical fiber.

Finally, another purpose of the invention is a device for laser cutting, comprising a device for generating focused laser radiation as described above.

This focusing lens can be built into a device that can be used on a cutting site. Focal lengths of the order of one meter (or more) may easily be achieved, which is impossible with conventional optical systems (refractive components). The "zoom" function can be made in a very simple manner, and does not require the use of large and fragile glass mirrors and/or lenses; all that is necessary to effectively change the focal length is to displace one of the optical components with respect to the other.

Furthermore, this process does not use any make up gas projection near the laser beam impact area.

Means may be provided to trigger laser emission means, in a pulsed and relaxed manner.

The use of a laser operating in pulse mode makes it possible to create very high energy plasma close to the impact area on the part to be cut. The consequence of pulse mode is to add a flush effect to heating of the material in order to replace the assistance gas used in conventional industrial applications. This flush effect is explained by the quality of the very high energy plasma created by laser pulses.

This plasma has another positive effect on cutting; it enables self focusing of the beam within the thickness of the cut material. This is explained by the fact that very deep high quality cuts are obtained despite the absence of assistance gas (cuts are very thin with parallel edges and the size is practically the same as the diameter of the focus spot, and with parallel edges) (thick materials can be cut because of the depth of the cut). The fact that thin cuts can be obtained also reduces the secondary waste (such as gas or metal ball type sediments) produced, and therefore prevents the focusing means present at the exit from the optical fiber becoming dirty too quickly.

Finally, also because of the creation of a plasma, operation in pulse mode enables a greater tolerance on other cutting parameters; for example, the precision of focusing is not very critical, and in any case is less critical than in techniques using a continuous beam. Plasma can produce an energy density higher than continuous mode. Due to this tolerance there is less need for servocontrol of focusing, and in-depth cuts can be made by self-focusing of the beam.

The use of a single laser mode (relaxed mode) can give a modal stability which guarantees uniform coupling for cutting.

It becomes easy to control a laser in pulse mode; the height, width and spacing of pulses are adjustable. Therefore it is possible to optimize cutting operations as a function of the context, given the effect of these pulse parameters on the space/time physics of the plasma created close to the impact area. For example, it is not necessary to send very high energy pulses if cutting is done on small thicknesses.

The end of the optical fiber may form part of a cutting head.

Means can also be provided for controlling the position of the end of the cutting head and/or means of controlling the beam focus.

Furthermore, means may also be provided for moving end of the cutting head. Thus, the cutting head itself will be moved in the case of a part to be cut which cannot be moved. These means of displacement may for example comprise one or several robot controlled arms.

BRIEF DESCRIPTION OF THE DRAWINGS

In any case, the characteristics and advantages of the invention will be better understood after reading the following description. This description applies to example embodiments given for explanatory purposes and in no way restrictive, with reference to the drawings in the appendix in which.

DETAILED DESCRIPTION OF THE PREFERRED EMBODIMENTS

Figure 1A:
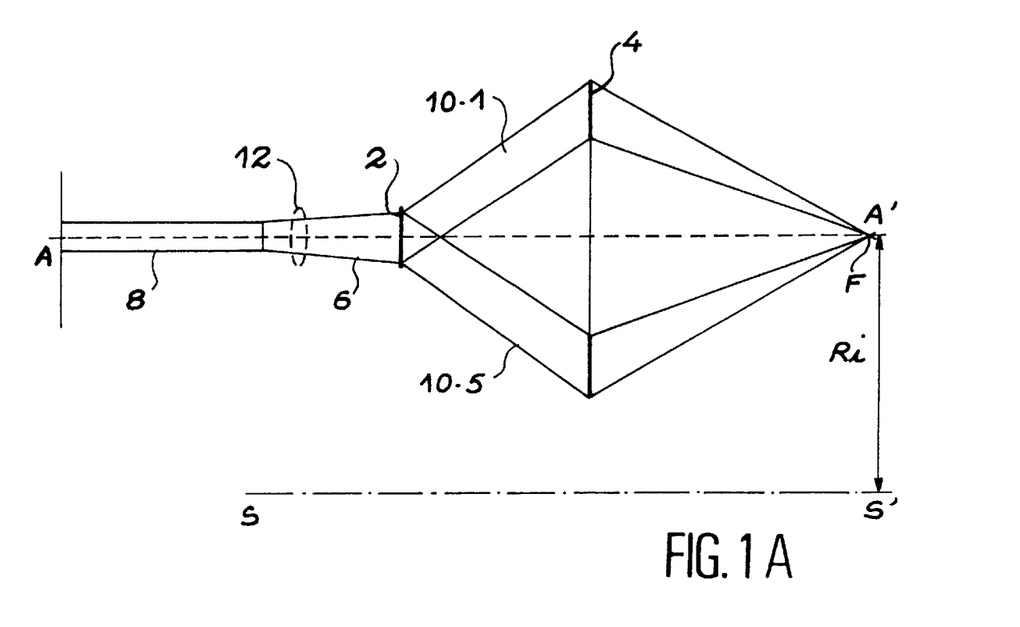
FIGS. 1A and 1B represent focusing devices according to the invention, in a transmission embodiment, showing a side view and a front view respectively.
Figure 1B:
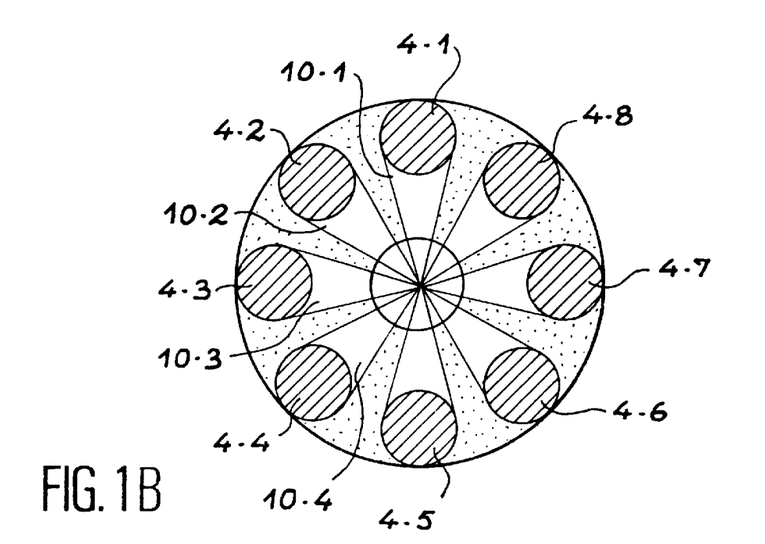

A first embodiment of an optical focusing device according to the invention will now be described with reference to FIG. 1. The system comprises two diffractive elements 2, 4.

The first element is a Fourier diffractive element that is used to separate an incident beam 6 (for example transported through an optical fiber 8) into n identical beams (n=4, 6, 8 or 10), in n directions symmetric about the optical axis AA'.

These n beams 10-1, . . . , 10-8 (n=8 in FIGS. 1A and 1B) are then directed towards n Fresnel lenses 4-1, 4-2, 4-3, 4-4, 4-5, 4-6, 4-7, 4-8, which in turn focus the n portions of the beam towards a point F on the center line AA'. Therefore, globally the complete device operates like a converging lens that refocuses the energy on the optical axis at a given distance. This distance depends on the optical assembly, and particularly on the distance between elements 2, 4 in the device.

Therefore the focusing device according to the invention uses a Fourier diffractive element to distribute the beam on a component operating as a synthetic aperture in diffractive mode, with the lens coded on a small pupil reproduced identically n times. The effective resulting component aperture exceeds the physical dimension of this component.

The input beam 6 could be collimated using diffractive type means 12, for example a spherical collimation lens operating in transmission.

Figure 2:
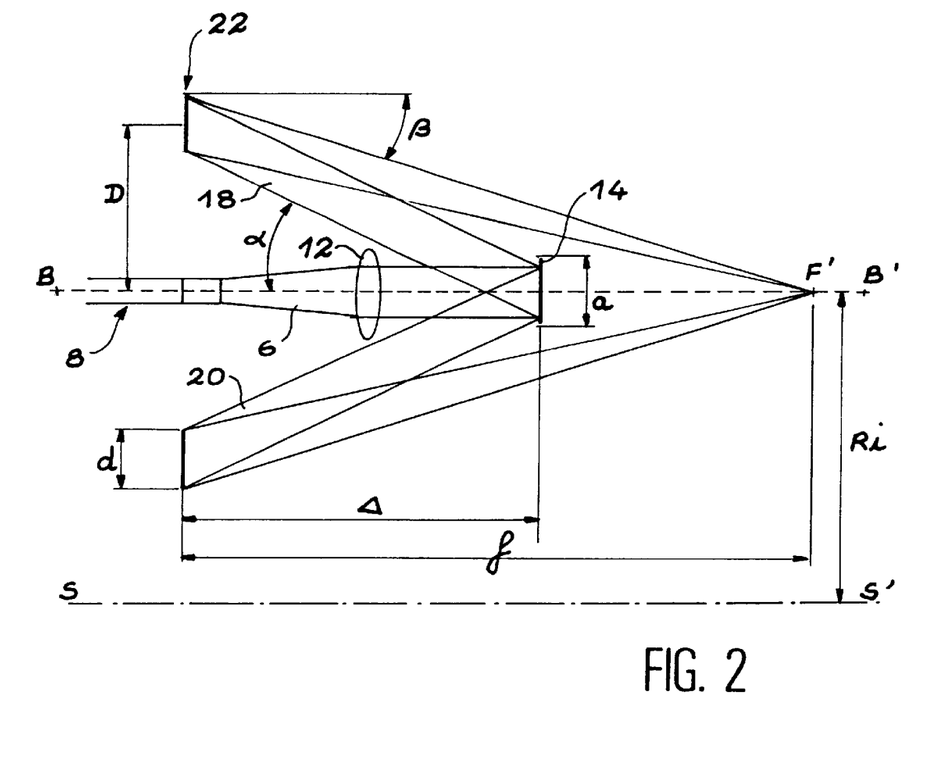
FIG. 2 shows a focusing device according to the invention, in an embodiment, in reflection, FIG. 3 diagramatically shows different orders diffracted by the two elements of a device according to the invention, in reflection.

Another embodiment of the invention will now be described with reference to FIG. 2. This second embodiment operates "in reflection". As in the case shown in FIG. 1, a beam 6, for example output from fiber 8, is sent towards a diffractive Fourier element 14. This elements operate in reflection. Beam 6 may possibly have already passed through collimation means 12, for example a spherical lens operating in transmission.

The Fourier diffractive element 14 distributes light from the incident beam into n identical beams, in n direction symmetric about the center line BB'. These n beams 18, 20, . . . are reflected towards the second element 22 in this focusing device. This second element actually comprises n Fresnel lenses. Each of these lenses will be capable of processing one of the beams 18, 20, etc. that are obtained after reflection on the Fourier diffractive element 14, this processing taking place in diffraction. The n beams are then focused to the same point F': in fact n focusing spots are obtained which will interfere with each other.

During the successive reflections on Fourier diffractive and Fresnel elements, different orders are reflected in different directions, and only some orders are reflected towards point F'. The energy output from unwanted orders may be recovered and trapped in cones made of light material.

In all embodiments, the device according to the invention works globally like a lens. But the device according to the invention is much more compact for equivalent performances (same aperture). The center line of the lens thus synthesized is not coincident with the optical axis (AA' in FIG. 1A, BB' in FIG. 2). The axis of the synthetic lens is marked by axis SS' in FIGS. 1A and 2: it is at a distance $R_i$ from the optical axis of the device.

According to one example embodiment, the beam 6 to be focused is the beam of a YAG laser (wave length=1.06 microns), it passes through a collimation lens 12 and meets a binary, square Fourier diffractive element 14 with side a=2 cm composed of square cells with a side dimension of 3 microns.

The Fresnel elements 22 are composed of eight identical spherical lenses with four phase levels. The pupil of each lens is round with diameter d=20 mm, and the center of each pupil is located at a distance D=50 mm from the axis BB'. The Fourier diffractive and Fresnel elements are separated by distance Δ, along axis BB':Δ=475.7 mm. Under these conditions, the point F' is separated from the plane containing Fresnel elements 22 by a distance f=1400 mm. After reflection on the Fourier element 14, the incident beam 6 is separated into eight symmetric beams reflected in eight symmetric directions with an angle γ=60°. Similarly, after reflection on the Fresnel elements 22, reflection takes place towards point F' with an angle β between −1.637° and −2.454° from a direction perpendicular to the plane containing the Fresnel elements 22.

In this example, the distance $R_i$ is equal to about 147.1 mm. The radius of a conventional refractive lens necessary to obtain the same focusing and aperture characteristics would be 197.1 mm.

The Fresnel lens coded through the eight identical and symmetric pupils off the center line, is composed of circular fringes on these pupils with periods varying from $$\frac{\lambda f}{2\left(D - \frac{d}{2}\right)}$$

for the maximum fringes to $$\frac{\lambda f}{2\left(D + \frac{d}{2}\right)}$$

for the minimum fringes, where D and d have the meanings defined above. Therefore the smallest structures etched under two phase levels will have a side dimension of 3.58 μm, and the smallest structures etched under four phase levels will have a side dimension of 1.97 μm.

Figure 3:
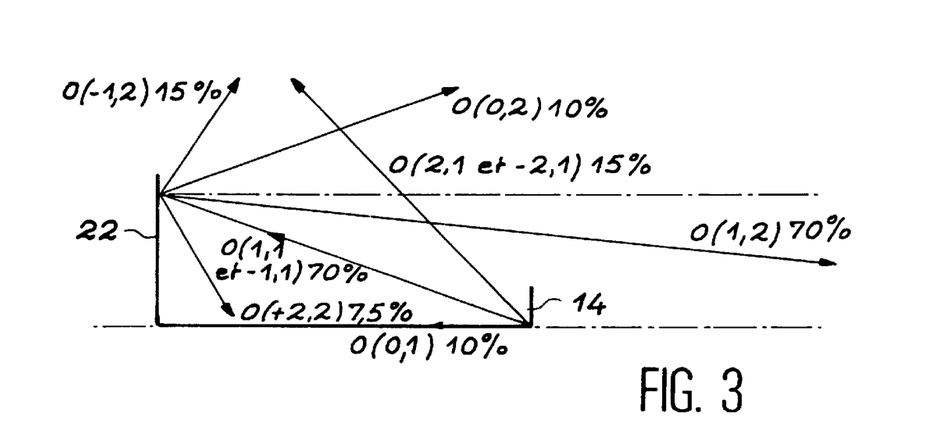

With these data, the reflection coefficients in the different orders are shown in FIG. 3, in which the expression O(n, m)×% represents order n output from element m, with an efficiency of ×%. The intensity of the incoming beam is assumed to be 100%.

In general, in a focusing device according to the invention, the longitudinal alignment tolerance of the Fourier element with respect to the Fresnel element, is coarse. This tolerance in the example given above is ±0.5 mm. This is due to the fact that since a Fourier diffractive element is used, there is invariance by translation. The lateral alignment tolerance is usually coarse, since the beams output from the Fourier diffractive element are only half the size of the pupils in the Fresnel element. The optical fiber and the collimation lens also have coarse alignment tolerances (of the order of 1 mm). However, the Fourier diffractive element is preferably kept as parallel as possible to Fresnel elements. This parallelism of the two elements may be obtained by adjustment, for example using micrometric screws placed on the back of the Fourier diffractive element.

The Fourier diffractive and Fresnel elements may be made of 1 mm thick etched quartz. The diffractive element thus obtained may be supported on a quartz substrate, which may for example be 5 mm thick. It may also be covered with a gold coating (about 50 nm), this coating facilitating evacuation of heat absorbed under the impact of radiation.

We will now describe a process for calculating the elements. For example, the first Fourier diffractive element may be optimized using an iterative algorithm called the GERCHBERG-SAXTON algorithm described for example in the article by R. W. GERCHBERG et al., untitled "A practical algorithm for the determination of phase from image and diffraction plane pictures", which was published in Optik, vol. 35, No. 2, pp. 237–246, 1972. This algorithm is capable of quickly calculating the phase of a complete wave function, for which the intensities in the diffraction plane and in the image plane of an optical system are known. The steps in this algorithm will now be described briefly with reference to FIG. 4.

Figure 4:
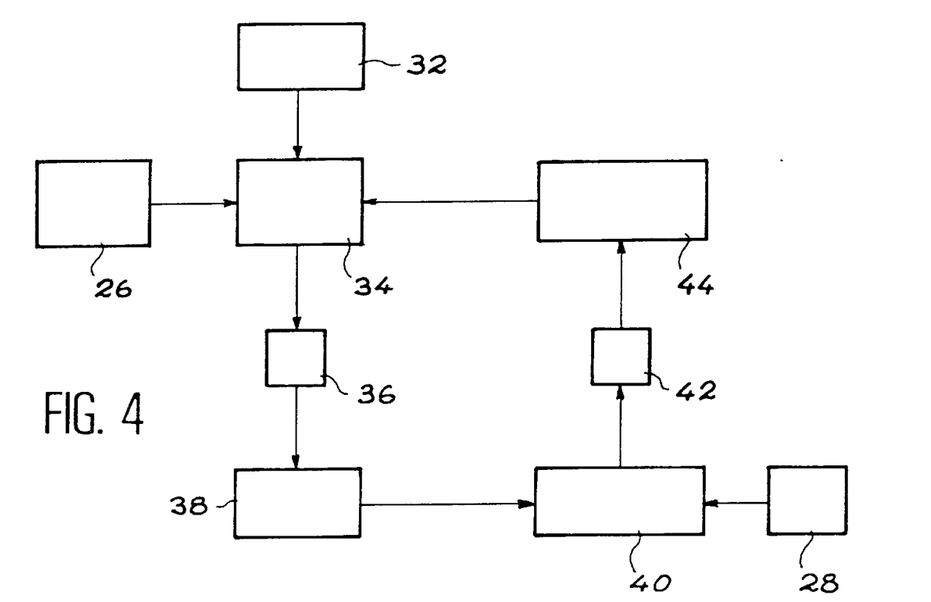
FIG. 4 is a diagram showing the steps in the calculation of a Fourier diffractive element.

The imposed constraints are the intensities sampled in the image plane and in the diffraction plane. The amplitudes are proportional to the square root of the measured intensities. These data may be stored in the memory of a microcomputer.

In a first step 32, a random number generator generates a set of random numbers between π and −π, which corresponds to an initial estimate of the phase of the sampled image amplitudes. (In FIG. 4, reference 26 denotes the step in which the intensity and amplitude in the image plane are sampled and stored, reference 28 denotes the step in which the same values in a diffraction plane are sampled and stored).

The random values are then multiplied by the amplitudes of the image plane (step 34). This thus generates a complex, discrete function, for which the Fourier transform (step 36) is then calculated by a Fast Fourier Transform (FFT) algorithm. The result is a complex function, from which the phases are extracted (step 38). These phase values are combined with amplitude values in the diffraction plane (step 40) and the function obtained is subjected (step 42) to a fast Fourier transformation, from which the phase is extracted (step 44). The phase is then combined with the amplitudes of the image plan (step 34) to form a new estimate of the complex function in the image plane. The process is then repeated iteratively.

In fact, the Gerchberg-Saxton algorithm is a phase calculation algorithm. There are two fields combined by a Fourier transform (the hologram field and the far field, composed of n symmetric points limited by the diffraction).

The algorithm allows the phase to vary in the two fields. The resulting phase in the hologram field is then digitized in two values only (0 and $\pi$).

This algorithm is a modeling and optimization algorithm; modeling is done during the first loop of the algorithm and optimization during subsequent loops.

In the special case of the optical focusing device according to the invention, the selected constraints are the intensities in the plane of the diffractive element, the divergence of the beam output from the multi-mode fiber, the constraint in the far field being the energy distribution according to the n Fresnel pupils 22.

The second element (Fresnel pupil) with synthetic aperture is given analytically by a calculation on a conventional commercially available code V type optical CAD, and is aspherical. For example, each pupil can be represented by the following phase profile:

$$\phi(x, y) = CircR_i, R_0 \left\{ \frac{2\pi}{\lambda} \sqrt{x^2 + y^2 + f^2} - f \right\}$$

where $R_i$ is the distance between the center of the synthetic lens and the center of a pupil; $R_0$ is the radius of a pupil, f is the focal length and $\lambda$ is the wave length of the laser.

The two elements of the optical device according to the invention may be manufactured by electron beam microlithography. Binary chromium masks are prepared by electron beams, transferred and aligned with a final substrate one after the other, and then ionically machined. For example, 4 chromium masks are used to make an element with 16 phase levels, with a size of about 2cm×2cm, and composed of 2048 square cells, each cell comprising a 10$\mu$m×10$\mu$m unit. The diffraction efficiency of this type of element is of the order of 95%, in other words only 5% of the light is lost.

Figure 5A:
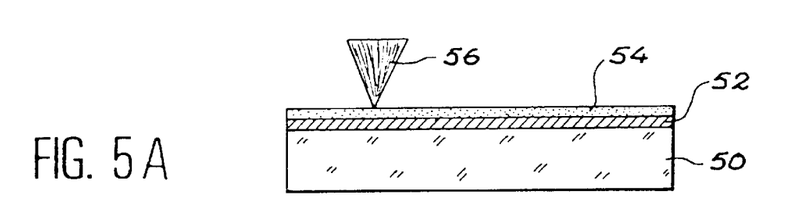
FIGS. 5A–5C show the steps necessary to make a chromium mask.
Figure 5B:
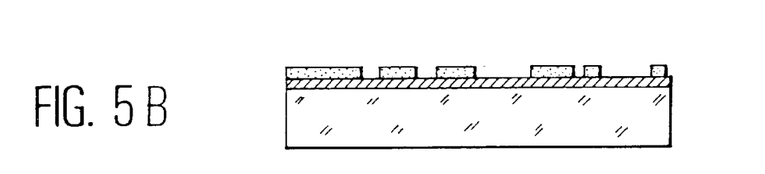
Figure 5C:
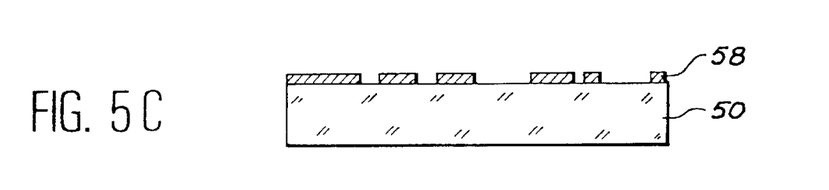

FIGS. 5A to 5C represent steps in making chromium mask. A layer of chromium 52 is deposited on a quartz substrate 50, together with a resin layer 54 that can be attacked by an electron beam 56. After the layer 54 has been etched (FIG. 5B), the chromium layer 52 is pickled, and the resin layer 54 is then pickled, by dipping in an acid bath. This thus gives the required chromium mask 58 (FIG. 5C).

Figures 6A, 6B:
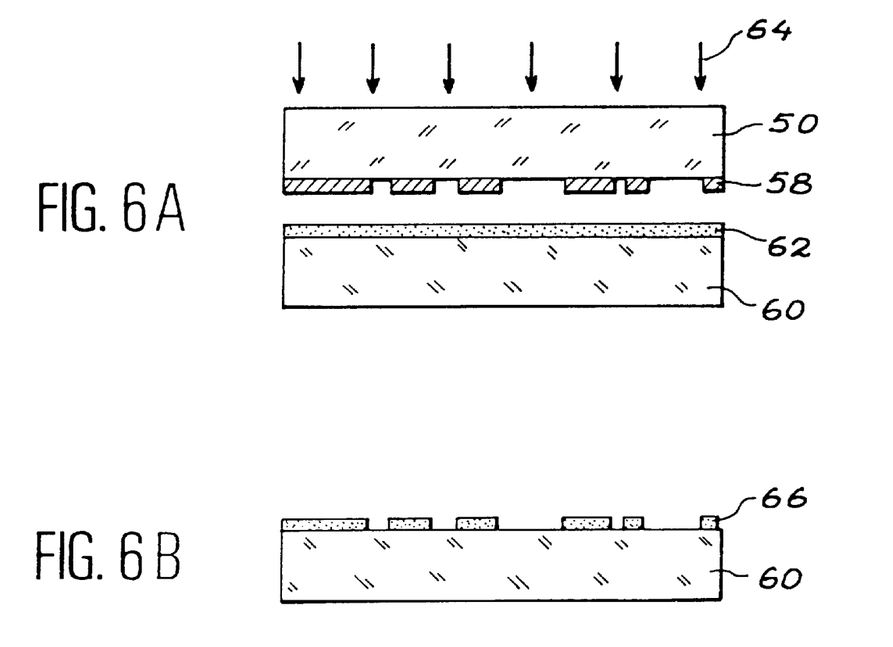
FIGS. 6A–6D show the steps involved in photolithographic transfer and machining of a substrate.
Figure 6C:
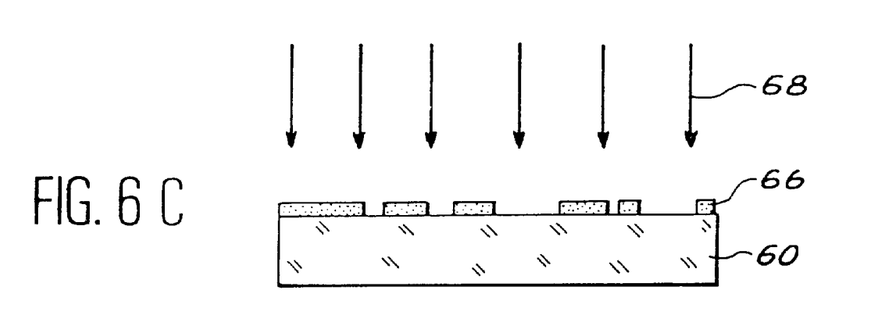
Figure 6D:
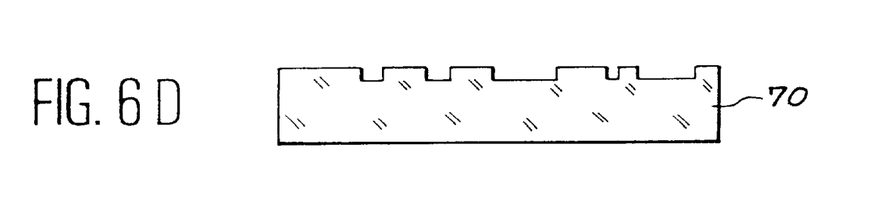

FIGS. 6A to 6D show the steps in photolithographic of the binary chromium mask 58 made previously, followed by machining of the final substrate, to obtain an element with two levels. A layer of photoresistant material 62 is deposited on a quartz substrate 60. An ultraviolet radiation beam 64 is directed towards substrate 60, passing through the chromium mask 58 (FIG. 6A). This thus gives a photo-resistant layer 66 reproducing the patterns of the chromium mask 58 (FIG. 6B). A beam 68 of collimated argon ions pickles the surface of substrate 60 to obtain an element 70, coded on the surface with two phase levels (FIG. 6D).

Figure 7A:
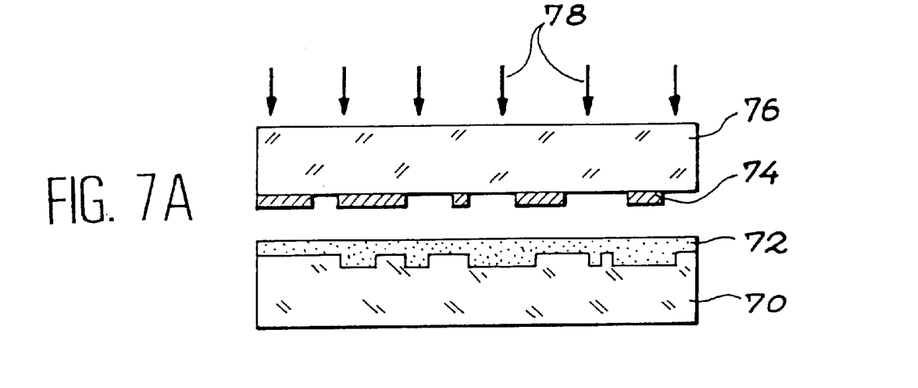
FIGS. 7A–7D show the steps necessary to make elements with $2^n$ phase levels.
Figure 7B:
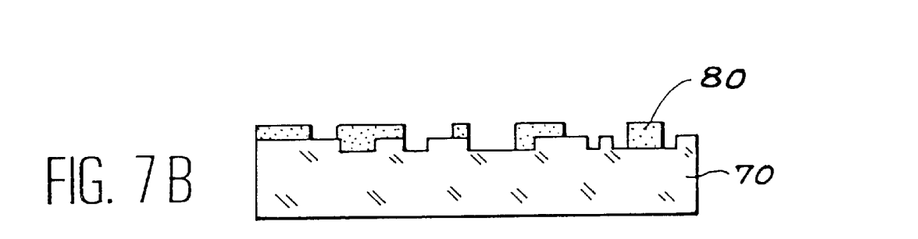
Figure 7C:
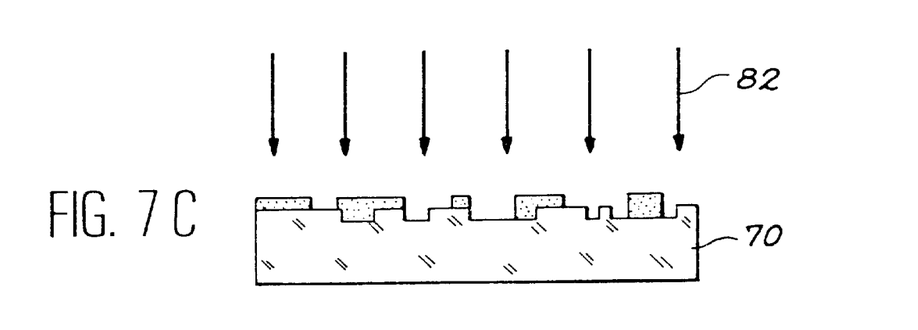
Figure 7D:
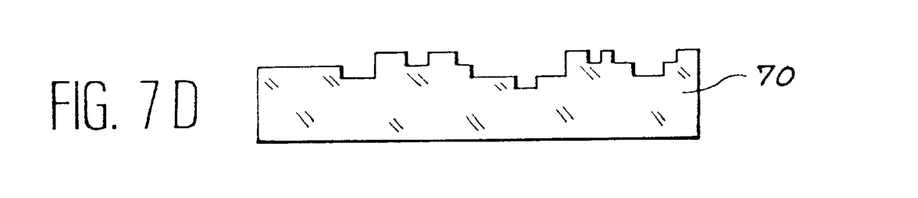

To obtain higher order phase levels, the substrate 70 is covered with a layer of photoresistant material 72 (FIG. 7A). A second binary mask 74 made of chromium, is formed on a substrate 76 using the technique described above with reference to FIGS. 5A–5C. The mask 74 and the substrate 70 are then aligned, and a collimated ultraviolet radiation beam 78 is directed towards substrate 70, passing through the binary mask 74 (FIG. 7A). This thus gives a substrate 70, the surface of which, already coded at two levels, is covered with a photoresistant layer 80 itself coded at two levels (FIG. 7B). A collimated argon ions beam 82 (FIG. 7C) transfers the coding from the photoresistant layer at the surface of element 70, which is thus coded at 4 phase levels (FIG. 7D).

In general, n binary masks are used to code an element with $2^n$ phase levels (n>2).

Fresnel elements are made taking account of the fact that the N pupils precisely code the same information. Therefore, in order to code with $2^n$ phase levels, N rather than nN chromium masks are prepared. The techniques described above with reference to FIGS. 5A–7D are used to prepare masks and for etching substrates. The first chromium mask is transferred onto a quartz substrate n times (for the n pupils) using a symmetry of revolution. After ionic machining, the second, third, $n^{th}$ chromium masks are transferred and machined ionically, until $2^n$ phase levels are obtained on the N elements. If 16 phase levels are made (n=4), the size of the quartz substrate used will be 6 inches ×6 inches.

In all cases, the mask aligner used is capable of aligning the various masks within ±0.5 $\mu$m.

From a practical point of view, the production of components according to the invention uses the next steps in the software which include the steps in the Gerchberg-Saxton algorithm and the steps for preparation of microlithography that have been described above.

1) Fill in a 1024 by 1024 matrix with a random phase (i.e. values taken at random between 0 and 2$\pi$) and fill in a 1024 by 1024 matrix with the intensity distribution of the incoming beam (YAG beam output from the multi-mode fiber).

2) Direct complex Fourier transformation (conventional FFT).

3) The phase information (matrix) is kept, the amplitude information (matrix) is replaced by the required amplitude distribution in the far field (in this case, eight symmetric light spots).

4) Transformation of the inverse complex Fourier.

5) The phase information is kept and the amplitude information is replaced by the amplitude distribution output from the multi-mode fiber.

Steps 2) to 5) are repeated n times (n=number of iterations).

6) The phase information (matrix) is corrected by thresholding at two levels:
   a) if the value of the continuous phase function obtained by the Gerchberg-Saxton algorithm exceeds the value of 1 is assigned to the phase,
b) otherwise $$(0 \text{ phase function} \leq \frac{\pi}{2}),$$

the value of 0 is assigned to the phase.

In the manufacturing process, 0 means no etching and 1 means etching (to a depth equal to $\lambda/(2(n-1))$. ($\lambda$=wave length, n=refractive index of the substrate).

7) This phase information is then formatted in the GDSII format.
8) The file is handed over to the microlithography manufacturing laboratory.
9) The element is copied in x and y to give a total circular pupil with a diameter of 2 cm.

The focusing device according to the invention may be used in combination with means of producing a laser beam. In particular, it is adapted to a high intensity pulse beam produced by lasers, for example a beam produced by Nd:YAG lasers, or iodine-oxygen lasers. Radiation produced by these laser sources has the advantage that it can be transmitted by optical fiber, and consequently the focusing device according to the invention can be placed at the exit from the optical fiber, which transmits the beam produced by laser radiation. In all cases, the focal point can easily be modified by a translational movement of one of the elements of the focusing device with respect to the other. The means to be implemented are thus not very large.

Figure 8:
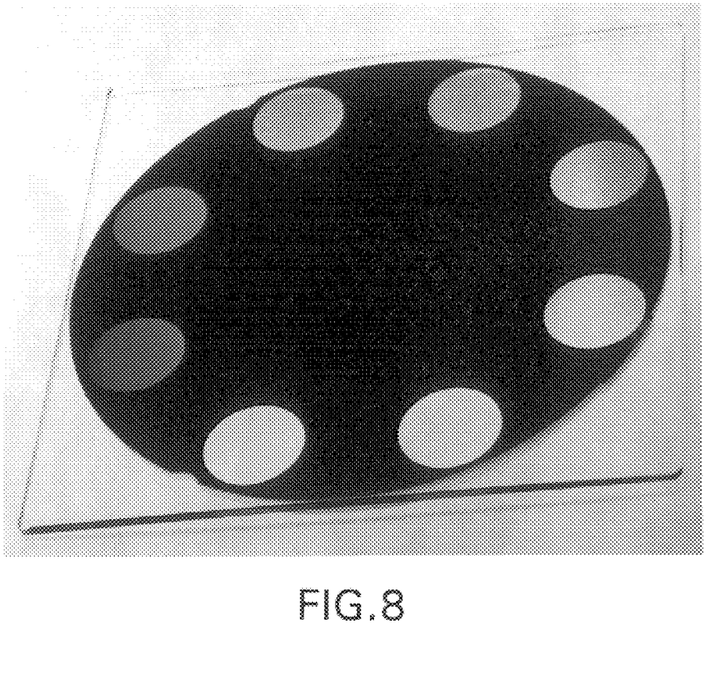
FIG. 8 is a plate showing a Fresnel element and FIG. 9 is a plate showing a portion of a Fourier diffractive element, used in a device according to the invention.

FIG. 8 shows a plate of a Fresnel element used within this invention. 8 Fresnel pupils are clearly shown, each having a diameter of 20 mm. They are distributed on a 127 mm (5 inch) diameter disk, the geometric center of each pupil being located at 50 mm from the center of the disk.

Figure 9:
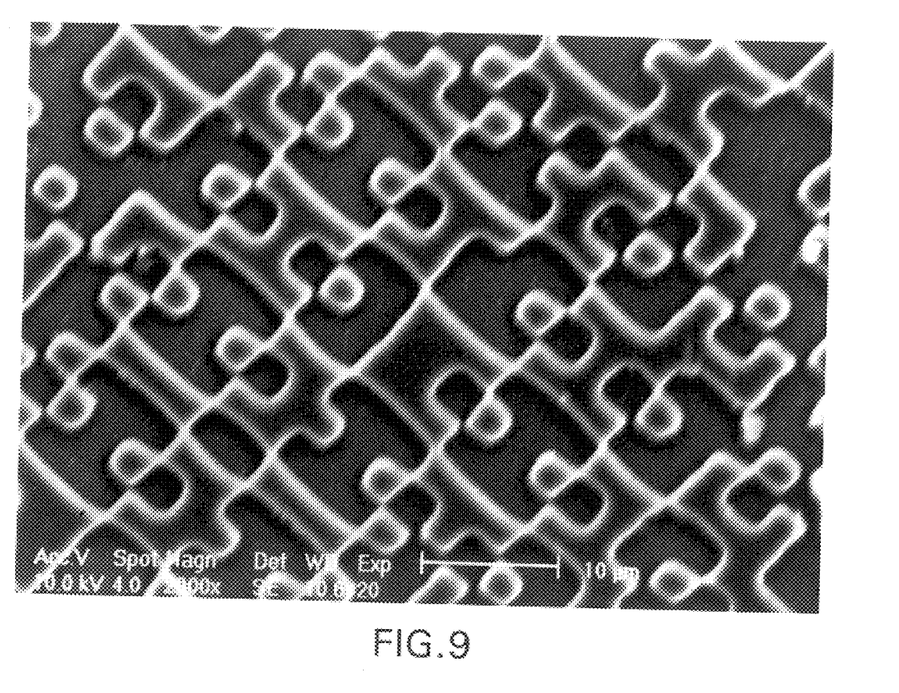

FIG. 9 shows a plate of a portion of a Fourier diffractive element used for the invention. The plate is made with an electronic microscope, at a scale of 3 cm to 10 μm.

Figure 10:
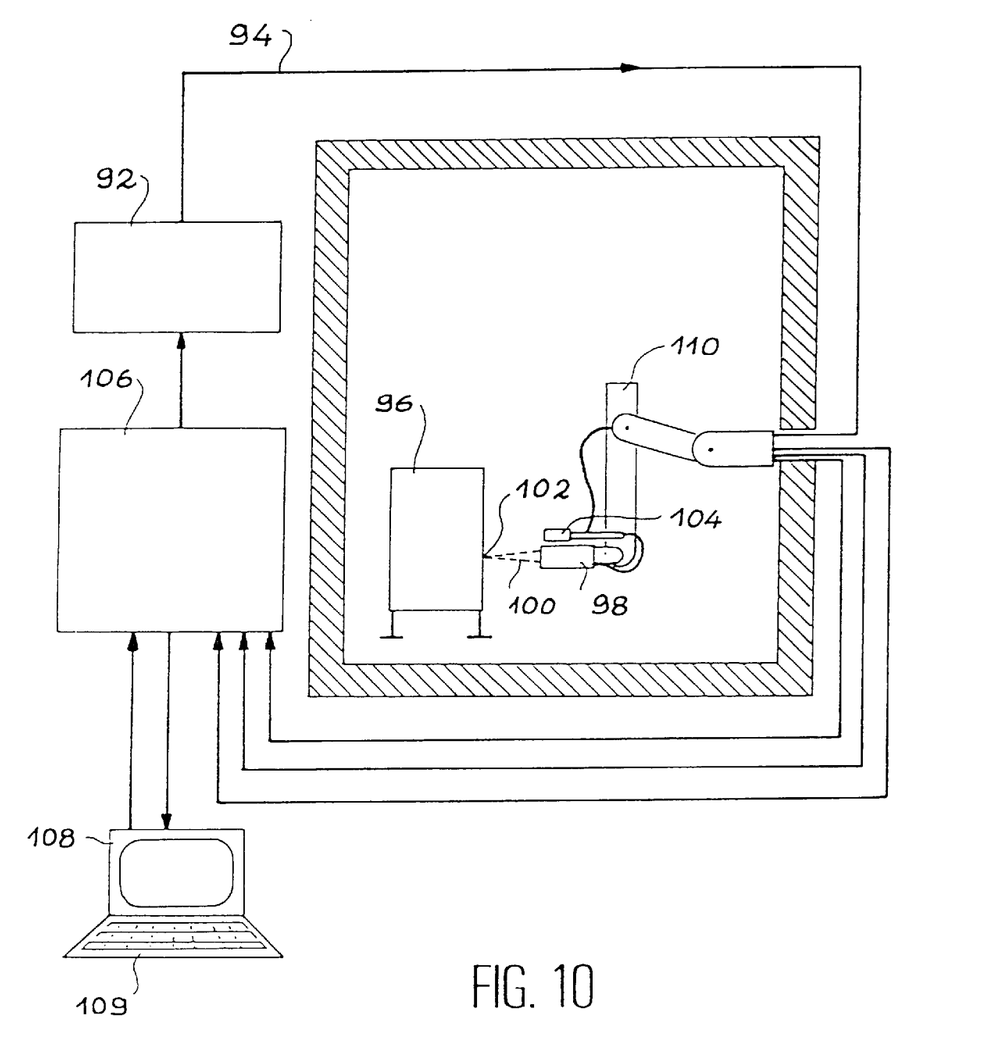
FIG. 10 is a diagram showing a cutting device according to the invention.

We will now describe an embodiment of the invention for a cutting or dismantling device, with reference to FIG. 10. Reference 92 denotes a laser source, for example a power Nd:YAG source, usable in pulse mode, and for which pulses may be controlled by frequency, energy and duration parameters. An optical fiber 94 is used to transport radiation output from the pulsed laser source to the part to be cut 96, located at a distance. In the case of dismantling operations, this distance may be as high as about 10 meters. The beam 100 is then projected towards the part 96, the end of the optical fiber possibly being held for example in a cutting head 98. An optical focusing device such as that described above (and not shown in FIG. 10) is used to focus the laser beam 100 onto an impact area 102, close to the surface of the part to be cut. This focusing device, with a fixed or variable focal length, may be incorporated into the cutting head 98. Furthermore, means 104, for example comprising a camera and/or telemeter and/or profile meter, may be provided close to head 98, or at the end of optical fiber 94, in order to evaluate the distance to the surface of the part.

Data transmitted from means 104 may be analyzed in a control device 106 provided for this purpose. A pulse control device (frequency, duration, energy, etc.) of the laser source 92 can be provided, consequently it may be integrated in the control device 106. This device may for example comprise a conventional microcomputer or microprocessor suitably programmed to analyze data. Appropriate program instructions may be recorded on a magnetic disk or on conventional RAM or ROM type drives. Furthermore, means 108 of displaying analyzed data or the image displayed using the camera may also be provided, and an operator can input control data using a keyboard 109 or a control station. The operator can thus make a decision about whether or not it is necessary to move the end of the optical fiber, and/or the focusing device and/or the focal length, with respect to the surface of part 96.

Means for controlling the position of the end of the fiber and/or means of controlling the beam focusing may also be provided; in particular, the cutting head and/or the focusing device may be automatically displaced whenever a certain distance, for example between the cutting head and the surface of the part 96 to be cut, has been measured and when comparison means, or the operator, has determined that the difference between this measured or evaluated distance and a certain predetermined distance, for example previously recorded in the memorization devices mentioned above, exceeds a certain distance.

Furthermore, it is often preferable to move the cutting head with respect to the part, rather than moving the part with respect to the cutting head, in order to make a cut groove. The part is often large, for example it may be part of a nuclear installation. In this case, means may be provided for the operator to control movements of the cutting head along a trajectory. Thus in the example shown in FIG. 10, a cutting head 98 includes the end of the fiber, and this cutting head is moved with respect to the part by means of a robot controlled arm 110 enabling various displacements in space (translation, pivoting about some axes). A robot-controlled arm 110 can be remote controlled using the control console 106 and interactive control means 108, 109. In this type of control, it may also be useful to be able to vary the head cutting speed with respect to the part to be cut.

In the case of a fixed focus, the remote operated arm 110 may be located in a cell to be dismantled. Tolerances on the long focal length f of the focusing device enable it to cut the environment to f±Δf, where Δf depends on the focal length and the characteristics of the materials to be cut.

Targets may be identified and automatically followed by computer input and shape analysis devices, or semi-automatically by including an operator in the loop, using resources of the remote presence devices particularly by means of methods developed for computer aided remote operation. These methods may be installed in the microcomputer of the control device 106.

The use of a "zoom" operating by displacement of one of the diffractive elements coaxially with respect to the other can result in a large working area varying from 0 m to 10 m. For longer distances, beam disturbances related to the optical trajectory in air have to be taken into account.

The use of the "zoom", for which the focal length can be servocontrolled starting from a measurement of the profile of the part to be cut, makes it possible to fire at variable distances, but also to relieve the remote operated arm 110 of the "hold at constant distance" from the part to be cut function.

The assembly forms homogeneous and efficient instrumentation, since it is compact and less sensitive to environmental disturbances (vibrations, shocks, dust, etc.), including ionizing radiation, than any other known technologies; therefore, the assembly is genuinely adapted to use on site, for example on nuclear power station dismantling sites. The focusing system making use of digital diffractive optics, is very lightweight (of the order of 250 g) and may easily be replaced in the form of a module; due to specific assembly features, no optical positioning and realignment is necessary. Maintenance operations on the cutting device may be simplified, since wear parts may be easily replaced by a standard module exchange; for example, a flash lamp for the laser pump or optical fiber to be replaced every 5000 hours of use by a standard exchange. The ends of removed fibers, if they are not excessively irradiated, may be repolished and reinstalled 2 or 3 times for another 5000-hour cycle.

What is claimed is:

1. An optical device, comprising:
    a first optical element configured to diffract and separate an incident beam into n beams along n directions symmetric in rotation about an optical axis defined by the incident beam, n being an integer;
    a second optical element comprising n Fresnel elements configured to focus the n beams onto a focal point on the optical axis, each Fresnel element being associated with one of the n beams.

2. An optical device according to claim 1, wherein:
    the first optical element is configured to reflect the incident beam into said n beams, and
    each of said Fresnel elements is configured to reflect and focus each of said n beams onto said focal point.

3. An optical device according to claim 2, further comprising a collimation element configured to collimate the incident beam.

4. An optical device according to claim 2, further comprising a displacement mechanism configured to apply relative displacements of the first optical element with respect to the Fresnel elements.

5. An optical device according to claim 2, further comprising:
    a laser configured to generate a laser beam; and
    a transmission mechanism configured to transmit said laser beam to said first optical element.

6. An optical device according to claim 1, wherein:
    the first optical element is configured to transmit said incident beam into said n beams, and
    each of said Fresnel elements is configured to transmit and focus each of said n beams onto said focal point.

7. An optical device according to claim 6, further comprising a collimation element configured to collimate the incident beam.

8. An optical device according to claim 6, further comprising a displacement mechanism configured to apply relative displacements of the first optical element with respect to the Fresnel elements.

9. An optical device according to claim 1, further comprising a collimation element configured to collimate the incident beam.

10. An optical device according to claim 9, wherein the collimation element comprises a refractive element.

11. An optical device according to claim 10, further comprising a displacement mechanism configured to apply relative displacements of the first optical element with respect to the Fresnel elements.

12. An optical device according to claim 9, further comprising a displacement mechanism configured to apply relative displacements of the first optical element with respect to the Fresnel elements.

13. An optical device according to claim 1, further comprising a displacement mechanism configured to apply relative displacements of the first optical element with respect to the Fresnel elements.

14. An optical device according to claim 1, further comprising:
    a laser configured to generate a laser beam; and
    a transmission mechanism configured to transmit said laser beam from said laser to said first optical element.

15. An optical device according to claim 14, wherein said transmission mechanism comprises an optical fiber.

16. An optical device according to claim 15, wherein said optical fiber has an end turned towards a part to be cut.

17. An optical device according to claim 16, further comprising an evaluating device configured to evaluate the distance between the end of the optical fiber and the part to be cut.

18. An optical device according to claim 15, further comprising a controlling mechanism configured to control at least one of a position of the end of the fiber and a beam focus.

19. An optical device according to claim 14, wherein said Fresnel elements are configured to refocus said n beams onto a part so as to cut said part.

20. An optical device according to claim 19, further comprising a triggering mechanism configured to trigger a laser beam emission, in a pulsed and relaxed manner.

21. An optical device according to claim 1, wherein n is greater than two.

22. An optical device according to claim 1, wherein n is equal to 4.

23. An optical device according to claim 1, wherein n is equal to 6.

24. An optical device according to claim 1, wherein n is equal to 8.

25. An optical device according to claim 1, wherein n is equal to 10.

* * * * *